United States Patent Office 3,619,869
Patented Nov. 16, 1971

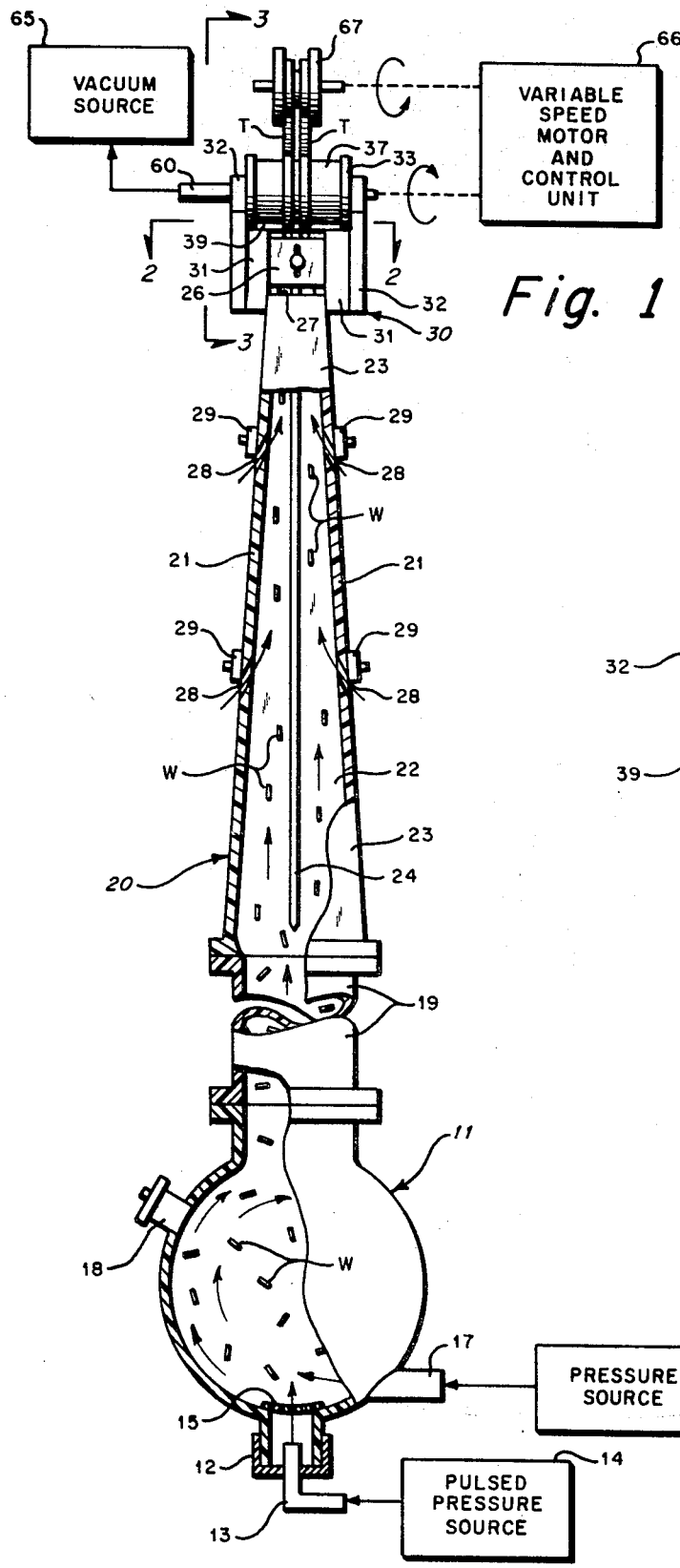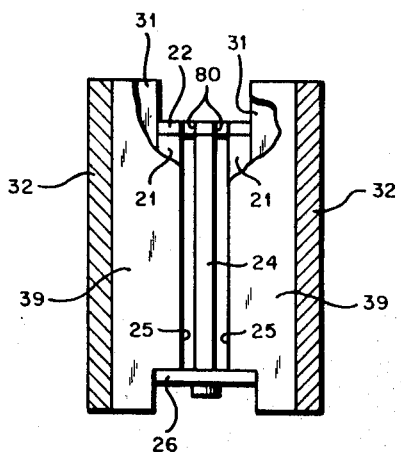

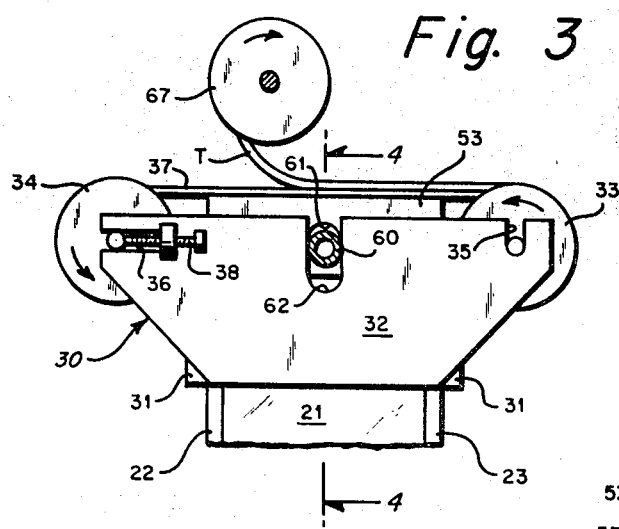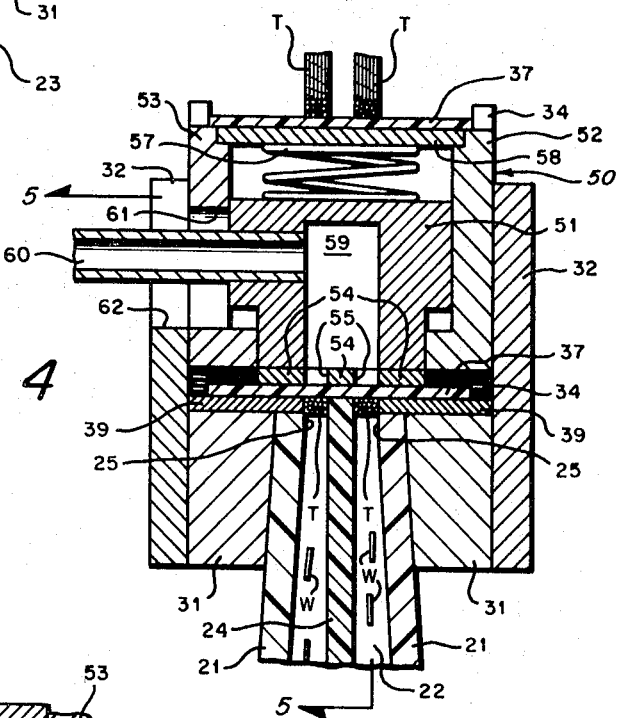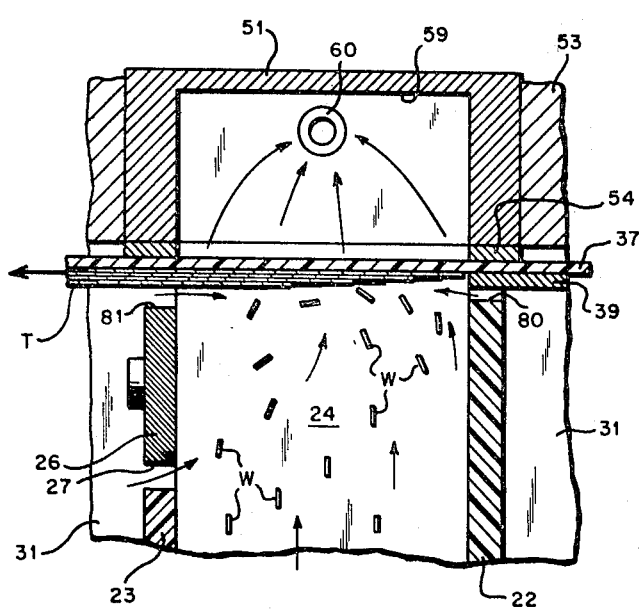

3,619,869
FIBER ALIGNING APPARATUS
Rimvydas P. Jakas, Norristown, Pa., and Joseph V. Mullin, Cherry Hill, N.J., assignors to the United States of America as represented by the Secretary of the Navy
Filed Jan. 2, 1969, Ser. No. 789,103
Int. Cl. D01g 25/00
U.S. Cl. 19—156.3
15 Claims

ABSTRACT OF THE DISCLOSURE

Apparatus for aligning fibers such as α-alumina whiskers and for forming strands or tapes of the longitudinally-aligned whiskers including a cone; pneumatic apparatus for delivering the whiskers to the cone; and endless, transversely movable, permeable belt for collecting aligned whiskers for the cone; a vacuum head positioned for accelerating the delivered fibers through the cone for collection on the belt; and stripping apparatus for collecting the tapes of longitudinally-aligned whiskers wherein the cone includes slots for establishing a whisker-accelerating flow field directed toward the belt and an influx slot for establishing a transverse flow immediately adjacent the belt causing the whiskers to be reoriented in a plane including the direction of belt movement immediately prior to collection.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates generally to fiber-aligning apparatus and, more particularly, to apparatus for forming strands of longitudinally-aligned fibers.

The quest for materials exhibiting high mechanical strength at elevated temperatures has led to exploration of reinforcing metals with oxide fibers or whiskers by incorporating such whiskers having large length-to-diameter ratios into suitable metallic matrices in order to produce strong, lightweight metallic composites. Such composites exhibit more desirable strength characteristics when the whiskers are substantially longitudinally aligned in the composite material. For example, bundles of unaligned whiskers often include voids and other matrix irregularities which greatly reduce the effective cohesive strength of the matrix and hinder the transfer of stresses to the whiskers at elevated temperatures. Heretofore, the method used in aligning the whiskers was an arduous, time-consuming manual process.

SUMMARY OF THE INVENTION

The general purpose of the invention is to provide apparatus for longitudinally-aligning fibers particularly of types such as metal oxide whiskers having large length-to-diameter ratios and, more particularly, for providing strands of longitudinally-aligned fibers. Briefly, the general purpose of the invention may be accomplished by providing apparatus including pneumatic means for delivering separated fibers and collections means including a cone for accelerating the fibers toward a collection screen or belt and for aligning the accelerated fibers generally in parallel. More particularly, the purpose of the invention is accomplished by providing a cone terminating adjacent a movable belt in a slot of width less than the length of the fibers and aligned with a belt movement direction and, still more particularly, by including a vacuum source and an inlet aperture formed in the cone adjacent the slot for directing a flow obliquely toward the slot generally in a planar region including a slot immediately adjacent the belt for reorienting the fibers substantially in parallel to each other and generally in the belt movement direction.

BRIEF DESCRIPTION OF THE DRAWING

FIG. 1 represents a partial block and schematic view in elevation of apparatus according to the invention;

FIG. 2 represents an enlarged view in cross section taken substantially along line 2—2 of FIG. 1;

FIG. 3 represents an enlarged view in elevation of a portion of the apparatus taken generally along line 3—3 of FIG. 1;

FIG. 4 represents a view in cross section taken substantially along line 4—4 of FIG. 3; and FIG. 5 represents a view in cross section taken substantially along line 5—5 of FIG. 4 having superimposed thereupon air flow lines present during operation of the apparatus.

DESCRIPTION OF THE PREFERRED EMBODIMENT

The apparatus of FIG. 1 includes a generally spherical separatory chamber 11 conveniently made of glass and having a vented bottom communicating with a debris collector 12 within which is arranged a nozzle 13 connected to a pulsed pressure source 14. A screen 15 is interposed between the nozzle 13 and the interior of the chamber 11 to position a charge of fibers or whiskers W above the nozzle 13. The chamber 11 communicates with a constant pressure source 16 through a pressure inlet vent 17 directed generally tangentially of the bottom of the chamber 11 to cause the charge to whirl within the chamber 11. The upper end of the chamber 11 includes a closable charging vent 18 through which the charge of fibers such as α-alumina whiskers is inserted into the chamber 11. The top portion of the chamber 11 communicates through an elongated tubular column 19 with the base of a hollow cone member 20. The pulsed output of the pulsed pressure source 14 is connected in frequency and in intensity in a manner such that the whiskers of a desired size begin to float up the column 19 to the cone 20 in a generally separated condition, generally ascending in steps caused by the pulsed jets of compressed air from the nozzle 13 directed through the whirling charge of whiskers and descending during the interval between pressure pulses. A more complete description of the separatory chamber 11 and the pulses pressure source 14 and of the preferred manner of utilizing them for separating and collecting metal oxide whiskers appears in the U.S. Patent application assigned to the General Electric Company and having Ser. No. 621,679 which was filed Mar. 8, 1968, by Jakes et al. for "Means for Separating Individual Fibers from a Fibrous Mass" now U.S. Patent No. 3,421,619. It is desirable, although not absolutely necessary, that the charge of whiskers be preliminarily separated, classified, and collected by apparatus and methods such as are particularly described in the above-identified application prior to processing by the apparatus of FIG. 1 for whisker alignment.

Generally, the hollow come member 20 has a gradually decreasing rectangular cross-sectional area bounded by a pair of opposed, converging rectangular plates 21 fixed to a parallel pair of opposed, trapezoidal end plates 22 and 23. A rectangular septum 24 having a tapered lower end confronting the column 19 is fixed between the trapezoidal plates 23 and 24 and symmetrically divides the interior of the cone 20 into a pair of tapered chambers each terminating at the smaller end in an elongated rectangular whisker efflux slot 25, shown in FIG. 2, whose width is defined by the plates 21 and the septum 24. The upper end of the trapezoidal end plate 23 terminates inwardly of the extended ends of the plates 21 and the septum 24 leaving room for a rectangular plate 26 slidably carried by the septum 24 to define a variable width influx slot 27 extending orthogonally of and in spaced relation to the parallel slots 25 and registering with each of the interior chambers. The plate 26 terminates inwardly of the extended ends of the plates 21 and the septum 24. The converging plates 21 also have formed therein upper and lower transversely extending air influx control slots 28 extending therethrough toward the slotted end of the cone 20 at angles of about 30 degrees relative to the longitudinal axis of the cone 20 and having mounted adjacent thereto slidable covers 29 for adjusting the slot width in variable degrees. The cone 20 may be made of translucent plastic to enable observation of the effects of slot adjustment during operation.

The whisker efflux slots 25, as shown in FIG. 2, should be substantially longer than the length of the fibers or whiskers being aligned as determined by the width of the plates 21 and should have a width substantially narrower as a factor of at least three than the length of the elongated whiskers to be aligned. For example, for α-alumina whiskers having cross-sectional area of about 10 microns and a length of about ⅜ inch, slot dimensions of 2½ inches by 50/1000 inch are satisfactory. The whisker efflux slot width, of course, determines the width of the strands or tapes T of longitudinally aligned fibers which the apparatus produces.

Fiber or whisker collection apparatus generally designated 30 is mounted on a pair of support blocks 31 fixed to the upper ends of the converging plates 21. More particularly, the apparatus 30, shown in detail in FIGS. 3 and 4, is carried by a pair of side plates 32 mounted on the blocks 31. A pair of belt spools 33 and 34 are arranged in parallel and are mounted rotatably in pairs of slots 35 and 36 formed in the plates 32 and carry an air pervious, endless belt 37 made of a finely meshed, flexible screen which is arranged thereby to coextensively extend over and move longitudinally of the whisker efflux slots 25 at the smaller end of the cone member 20. More particularly, the pairs of spool-carrying slots 35 extend parallel to the cone 20 while the pair of slots 36 are perpendicularly oriented relative to the cone 20. The apparatus includes a pair of tightening screws 38 mounted adjacent the pair of slots 36 for longitudinally spreading apart the parallel axes of rotation of the spools 33 and 34 to tighten the belt 37. As is shown in FIG. 3 smooth, belt bearing plates 39 are mounted on the blocks 31 in coplanar, spaced relation defining an aperture 40 registered with the whisker efflux slots 25.

More particularly, the apparatus as shown in FIG. 4 also includes a suction or vacuum attachment generally designated 50 including registered with the efflux slots 25 a floating vacuum head 51 confined within the encircling belt 37 for movement toward and away from the cone adjacent portion of the belt 37 by a pair of guide members 52 and 53. The members 52 and 53 are carried by the side plates 32 in spaced relation to the plates 39 to enable free movement of the belt 37 therebetween. The head 51 carries a belt confronting plate 54 having a pair of parallel, rectangular slots 55 coextensively arranged in parallel registration with the efflux slots 25, the belt 37 being interposed. The plate 54 is normally urged into engagement with the belt 37 by a coil spring 57 captured between the head 51 and a recessed cover 58 connected to the members 52 and 53. The head 51 includes a rectangular cavity 59 extending coextensively with and communicating with the slots 25 through the air pervious belt 37.

A tubular conduit 60 communicating with the head cavity 59 extends through slots 61 and 62 formed in the adjacent plate 32 and member 53. The tube 60, in turn, is connected through a flexible tube (not shown) to a vacuum source 65 indicated in FIG. 1 which may be a conventional industrial vacuum cleaner suction source.

One of the spools such as 33 is connected to a variable speed motor and control unit 66 which drives the spool 33 and the endless belt 37 at the appropriately adjusted speed for collecting a sufficient concentration of aligned whiskers to form tapes T of the desired thickness. A tape storage reel 67 is arranged adjacent the endless belt 37 to receive the strands or tapes T of longitudinally aligned whiskers from the belt 37 for storage and may be driven by the motor and control unit 66 at the appropriately adjusted speed to avoid tearing the tapes T. A photoelectric system responsive to a predetermined amount of slack in the tapes T alternatively may be used to drive the reel 67.

The operation of the apparatus to align the whiskers W to form the tapes T may be better understood by referring to FIG. 5. Generally the whiskers which are floating upwardly from the column 19 into the cone member 20 are aligned transversely of the direction of flow and tend to ascend with each pressure pulse applied through the nozzle 13 and descend slightly until the next pulse of pressure causes them to float further along the cone 20. Because of the suction being applied through the head 51 and the belt 37 and because of the gradually decreasing areas of the interior chambers in the cone 20, the flow velocity directed toward the slots 25 begins to substantially increase; and the whiskers W are accelerated toward the slots 25 and the belt 37. The whiskers W tend to align themselves generally with the accelerated flow direction and thus approach the belt 37 at the terminus of the slots 25 with a substantially perpendicular orientation. However, the inflow of air being sucked through the influx slot 27 into the interior cone chambers by the vacuum source 65 causes a similarly directed reorientation of the whiskers parallel to or obliquely of the belt 37 as is indicated in FIG. 5. The location of the slot 27 is preferably one which lies at an angle of about 45 degrees relative to the plane of the belt 37 at the center of the cavity 59, i.e., the slot 27 is spaced normally of the belt 37 a distance equal to about one-half the length of the efflux slots 25. The slot 27 thereby establishes a flow extending obliquely of the slots 25 in parallel planes including the slots 25 which reorient the substantially vertically oriented whiskers W into the obliquely aligned or substantially parallel orientations relative to the slots 25 and the belt 37. The air flow directed through the belt 37 for the conduit 60 compacts the whiskers W in longitudinal alignment against each other to form each of the tapes T on the underside of the belt 37. Even though a particular whisker may not be aligned parallel to the belt 37 prior to collection, one end thereof striking the belt 37 first, the suction being applied through the belt 37 pivots the whisker and causes it to extend along the belt 37 in alignment with the other collected whiskers.

The upper end of the plate 22 immediately adjacent the ends of the slots 25 confronting the incoming portion of the belt 37 is preferably notched as at 80 to permit a small intensity influx of air as pulled into the cone 20 by the suction source 65. The influx flow prevents fiber blow out and further inhibits jamming by reason of collection of unremoved fibers or whiskers on the underside of the belt 37 adjacent the plate 22. The upper terminus of the slidable plate 26 also is spaced beneath the belt 37 not only to permit the efflux of the tapes T carried by the belt 37 but also to permit an influx flow of air as forced by the vacuum source 65 to further aid in reorienting the whiskers to obliquely aligned or substantially parallel positions relative to the slots 25 and belt 37 prior to collection and prevent the blow out of whiskers. It will be noted that the whiskers are primarily deposited adjacent the center of the head cavity 59. It may be necessary to readjust the width of the slot 27 by altering the position of the plate 26 or to balance the difference in aperture sizes and, therefore, influx flow intensities, permitted by the slot 27 and the notches 81 formed by the uppermost edge of the plate 26 below the belt 37. If the width of the slot 27 is completely closed or too narrow, many whiskers W tend to be driven partially through the belt 37. The whiskers are prevented from orienting themselves to extend in planes extending transversely of the belt movement direction by reasons of the flow orientation in the region adjacent the belt 37 and of the slot width which is substantially smaller than the contemplated whisker length.

If the suction intensity is sufficiently great, the fibers will be compacted tightly together in mutually aligned orientations by the suction, and the integrity of the tape T will be preserved during its removal from the belt 37 by the reel 67. If a fluffier tape is desired the suction intensity may be decreased as by valves.

It is further contemplated that an air pervious cloth backing strip may be used instead of or in addition to the endless belt 37 which backing strip can be delivered by a conventional roller system. The tapes T will be deposited thereon in the same manner as described for the belt 37, and a facing strip of air pervious cloth may be applied in a conventional manner upon exit from the cone 20. Such laminar strips having one or more sandwiched tapes T of aligned whiskers may then be stored and later processed as by impregnation with a metallic coating to form a composite of desirable mechanical properties.

It is also contemplated both that the cone 20 need not include the septum 24 for forming two tapes T and that the cone 20 may include additional septa forming more than two internal cone chambers for simultaneously forming more than two tapes T. Each such cone chamber should be characterized by a gradually decreased cross-sectional area in order to cause acceleration of the fibers or whiskers toward the respective whisker efflux slot 25. The cone 20 may also include electrostatic means arranged adjacent the slot to assist in accelerated fiber reorientation obliquely of the belt 37.

The invention, therefore, provides apparatus which automatically provides longitudinally aligned fibers and obviates the arduous time consuming processing of aligning the fibers by hand. Satisfactory products having 60 to 70 percent of the fibers or whiskers aligned within ±15° of the direction of belt movement have been consistently obtained with the apparatus. Even better results in terms of smaller degrees of alignment deviation are obtained by the use of narrower efflux slots 25 relative to the length of the fibers or whiskers and by more precise control over the flow pattern present in the region of the cone 20 adjacent the slots 25 by careful adjustment of the slidable plate 26. The covers 29 may be adjusted to further vary the intensity of the flow within the cone 20 and to vary the whisker deposition rate. When used with metal oxide whiskers, the tapes T produced by the apparatus greatly simplify the formation of reinforced composite materials.

Obviously many modifications and variations of the present invention are possible in the light of the above teachings. It is therefore to be understood that within the scope of the appended claims the invention may be practiced otherwise than as specifically described.

What is claimed is:

1. Apparatus for aligning randomly-oriented fibers comprising:
   means for separating the fibers;
   means operatively connected to said separating means to receive the fibers from said separating means including pneumatic means for accelerating the fibers therethrough and substantially aligning the longitudinal axes thereof in a first direction with the acceleration;
   means connected to receive the accelerated fibers from said accelerating means for reorienting the fibers in a second direction in parallel planes transversely to said first direction; and
   means operatively connected to said reorienting means to collect the reoriented fibers in a plane parallel to said second direction from said reorienting means.

2. Apparatus according to claim 1 wherein said accelerating means comprises:
   an elongated, truncated, hollow cone member having its larger end connected for receiving the fibers from said separating means and terminating at its smaller end in an efflux slot arranged adjacent said collecting means.

3. Apparatus according to claim 2 wherein:
   said efflux slot has a length greater than and width less than the length of the fibers to be aligned.

4. Apparatus according to claim 2 wherein:
   said reorienting means has formed therein an influx slot spaced from and extending orthogonally of said efflux slot for introducing a transverse, fiber reorienting flow into said region adjacent said collecting means.

5. Apparatus according to claim 4 wherein:
   said cone member comprises a cone of generally rectangular cross section having converging sides and parallel sides, said influx slot being formed in one of said parallel sides, and
   a septum extending between said parallel sides and longitudinally of said cone member for dividing said cone member into a pair of chambers each terminating in a respective said efflux slot adjacent said collection means; and
   said collecting means includes screen means movable longitudinally of said efflux slots.

6. Apparatus according to claim 4 wherein:
   said collecting means includes an air pervious screen; and
   said pneumatic means includes suction means arranged for applying suction through said screen and to said cone member through said efflux slot means.

7. Apparatus according to claim 6 further comprising:
   means for moving said screen longitudinally of said efflux slot.

8. Apparatus according to claim 6 wherein said suction means comprises:
   a head having formed therein a cavity coextensive and communicating with said efflux slot, said screen being interposed therebetween; and
   vacuum source means connection to apply suction to said cavity.

9. Apparatus according to claim 8 wherein said suction means further comprises:
   spring means arranged for normally urging said head against said screen.

10. Apparatus according to claim 6 wherein said separating means comprise:
    a hollow, spherical separatory chamber;
    column means connected for establishing communication between said separatory chamber and said cone member interiors;
    pressure means;
    vent means connected to said pressure means and arranged for directing a flow generally tangentially of the interior periphery of said chamber to establish whirling motion of a charge of fibers within said chamber; and
    means for applying pulsed pressure to said separatory chamber, said pressure being directed across the chamber interior and through said column means toward said cone member.

11. Apparatus according to claim 6 wherein said cone member comprises:
    a pair of rectangular plates arranged in converging relation;
    first and second trapezoidal end plates connected at their edges to said rectangular plates for forming said hollow cone member, one of said trapezoidal plates terminating inwardly of the slotted end of said cone member; and a plate slidably mounted for forming with said one trapezoidal plate said influx slot of variable width spaced from said efflux slot.

12. Apparatus according to claim 11 wherein:
said pair of rectangular plates have transversely extending slots formed therein in spaced relation to said influx slot for permitting influx flows therethrough into said cone and toward said influx and efflux slots.

13. Apparatus according to claim 11 wherein:
said apparatus further comprises means for moving said air pervious screen longitudinally of said efflux slot;
said influx slot is arranged on the side of said cone toward which said screen is moved; and
portions of the edges of said slidable plate and the other of said trapezoidal end plates which confront said screen and the ends of said efflux slot are spaced from said screen to permit influx flows into said cone longitudinally of said efflux slot.

14. Apparatus according to claim 13 wherein:
said influx slot is spaced from said screen a distance approximating one-half the length of said efflux slot.

15. Apparatus according to claim 6 wherein:
said air pervious screen forming an endless belt connected to said cone member for movement longitudinally of and adjacent said efflux slot;
said suction means includes a suction head encircled by said belt and connected to said cone member for movement normally of said efflux slot, said head having a suction cavity formed for connection to a suction source and extending coextensively with said efflux slot; and
spring means arranged for urging said head into engagement with said belt.

References Cited

UNITED STATES PATENTS

| 2,442,880 | 6/1948 | Schwartz | 19—155 |
| 2,468,827 | 5/1949 | Kennedy et al. | 19—150 X |

FOREIGN PATENTS

| 881,523 | 11/1961 | Great Britain | 19—155 |
| 934,194 | 8/1963 | Great Britain | 19—150 |

DORSEY NEWTON, Primary Examiner

U.S. Cl. X.R.

19—150